(12) United States Patent
Nishino et al.

(10) Patent No.: US 8,506,020 B2
(45) Date of Patent: Aug. 13, 2013

(54) BRAKE CONTROL SYSTEM

(75) Inventors: Kimio Nishino, Minami-alps (JP);
Toshiyuki Innami, Mito (JP); Norikazu Matsuzaki, Minami-alps (JP);
Masayuki Kikawa, Kai (JP); Takuya Obata, Minami-alps (JP); Takayuki Ohno, Yokohama (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 649 days.

(21) Appl. No.: 12/708,210

(22) Filed: Feb. 18, 2010

(65) Prior Publication Data

US 2011/0025119 A1 Feb. 3, 2011

(30) Foreign Application Priority Data

Jul. 30, 2009 (JP) ................. 2009-178317

(51) Int. Cl.
*B60T 13/74* (2006.01)
(52) U.S. Cl.
USPC ............................. 303/3; 303/122.04; 303/20
(58) Field of Classification Search
USPC ........ 303/113.4, 113.5, 3, 10, 11, 15, DIG. 3, 303/122.04, 122.05, 155, 122.09, 20
See application file for complete search history.

(56) References Cited

U.S. PATENT DOCUMENTS

| 2008/0265665 A1 | 10/2008 | Drumm |
| 2009/0039702 A1 | 2/2009 | Nishino et al. |
| 2009/0045672 A1 | 2/2009 | Nishino et al. |
| 2009/0217659 A1 | 9/2009 | Ohno et al. |
| 2009/0236903 A1 | 9/2009 | Nishino et al. |

FOREIGN PATENT DOCUMENTS

| JP | 2007-296963 A | 11/2007 |
| JP | 2008-30599 A | 2/2008 |
| JP | 2008-529892 A | 8/2008 |
| JP | 2009-040290 A | 2/2009 |

OTHER PUBLICATIONS

Japanese Office Action dated Oct. 18, 2011 (Three (3) pages).

*Primary Examiner* — Melanie Torres Williams
(74) *Attorney, Agent, or Firm* — Crowell & Moring LLP

(57) ABSTRACT

A brake control system that enables accurate brake control is provided that precisely detects a master-cylinder pressure and includes a back-up function. The brake control system includes a master-cylinder operated by a brake operation of a driver; a first mechanism that regulates a pressure inside the master-cylinder according to the brake operation amount; a first control apparatus that controls operation of the first mechanism; a second mechanism that regulates communication of the pressure inside the master-cylinder to a wheel-cylinder; and a second control apparatus that controls operation of the second mechanism and operation of a pump apparatus that increases a pressure communicated to the wheel-cylinder. The first and second control apparatuses each have a power supply circuit and CPU. The brake control system further includes a first hydraulic pressure sensor that measures a pressure inside the master-cylinder and is electrically connected to the first control apparatus, and a second hydraulic pressure sensor that measures a pressure inside the master-cylinder and is electrically connected to the second control apparatus.

3 Claims, 8 Drawing Sheets

[ Operation of master cylinder pressure control apparatus 3 ]

BRAKE CONTROL SYSTEM

BACKGROUND OF THE INVENTION

1. Field of the Invention

The present invention relates to a brake control system that electrically controls a brake hydraulic pressure for generating a braking force, that is generated by a master-cylinder.

2. Background Art

JP Published Patent Application No. 2007-296963 discloses technology for a brake apparatus that includes a tandem master-cylinder that is operated by a brake operation of a driver, an electrically driven brake booster, and an ABS apparatus. A pressure sensor is provided in each main pipe that extends from primary and secondary chambers of the master-cylinder to the ABS apparatus. The pressures of the primary and secondary chambers of the master-cylinder are detected by the two pressure sensors, and rotation of an electric motor of the electrically driven brake booster is manipulated based on the detection result. As a result, a booster piston advances and retracts with respect to an input piston such that the hydraulic pressure is controlled to a constant pressure.

JP Published Patent Application No. 2008-30599 discloses technology for an electrically driven brake booster including a master-cylinder, an electrically driven actuator, and control means that controls the electrically driven actuator in accordance with movement of a shaft member that advances and retreats in accordance with operation of a brake pedal. A simulator is also provided that generates a reactive force that opposes a depressing force on the brake pedal. According to this technology, when the brake pedal is operated, control is performed such that a booster piston moves to a greater degree than a push rod so that a clearance is formed between the push rod and the piston. At a time of regenerative cooperation that causes the booster piston to retract, a force in a return direction that is transmitted to the push rod from the piston is released by means of the clearance. Thus, a feeling of incongruity is not imparted to the driver.

JP Published Patent Application No. 2009-40290 discloses a brake control apparatus that includes a master-cylinder that is operated by a brake operation of a driver, a brake booster mechanism for applying pressure in wheel-cylinders by operating the master-cylinder separately from the braking operation of the driver, a first control unit that controls an operation of the brake booster mechanism, a hydraulic pressure control part provided separately from the brake booster mechanism and having a hydraulic pressure source capable of applying the pressure in the wheel-cylinders, and a second control unit that controls the operation of the hydraulic pressure control part. The first control unit detects a failure state of the first control unit itself or the brake booster mechanism, and the first or second control unit executes a backup mode that limits the operation of the brake booster mechanism or the hydraulic pressure control part according to the detected failure state.

SUMMARY OF THE INVENTION

JP Published Patent Application No. 2007-296963 discloses technology that detects the pressure of primary and secondary chambers of a master-cylinder by providing pressure sensors in the main pipes and electrically connecting the sensors to booster control means. However, JP Published Patent Application No. 2007-296963 does not mention anything regarding improving the detection accuracy of the two pressure sensors.

JP Published Patent Application No. 2008-30599 discloses technology in which a detection signal from a pressure sensor that is electrically connected to a controller is used for controlling the hydraulic pressure of a pressure chamber of a master-cylinder. However, this pressure sensor is provided in a brake pipe and, furthermore, only one pressure sensor is provided. JP Published Patent Application No. 2008-30599 does not mention anything regarding technology for improving the detection accuracy of a pressure sensor.

JP Published Patent Application No. 2009-40290 also does not mention anything regarding technology for improving the detection accuracy of a pressure sensor.

An object of the present invention is to enable measurement by a pressure sensor to be performed at a high accuracy.

In this connection, the embodiments described below solve not only the aforementioned object, but also solve several problems that are required to be solved from the viewpoint of a product. Problems solved by the embodiments described below and means for solving the problems are described specifically in the description of the embodiments described later.

To solve the above problem, a brake control system according to this invention includes a master-cylinder that includes a primary piston that is controlled by an electric motor, and controls the primary piston based on a brake operation to generate a brake hydraulic pressure. A brake hydraulic pressure generated by the master-cylinder is used for a braking operation of wheel-cylinders. A brake hydraulic pressure that the master-cylinder generates is detected by a plurality of pressure sensors.

One feature of this invention is that a control apparatus that utilizes the respective outputs of the plurality of pressure sensors supplies a power supply voltage to a pressure sensor that generates an output that is utilized, and the control apparatus supplying the power supply voltage receives an analog signal from the pressure sensor to which the power supply voltage is supplied, and carries out pressure detection based on the analog signal.

Another feature of this invention is that the brake control system includes a first mechanism that adjusts a pressure inside the master-cylinder according to an amount of a brake operation, a first control apparatus that controls operation of the first mechanism, a second mechanism that regulates communication of the pressure in the master-cylinder to wheel-cylinders, and a second control apparatus that controls operation of the second mechanism and operation of a pump apparatus that increases a pressure that is communicated to the wheel-cylinders, wherein the first and second control apparatuses each have a built-in power supply circuit and a CPU, and the brake control system includes a first hydraulic pressure sensor that measures a pressure inside the master-cylinder and is electrically connected to the first control apparatus, and a second hydraulic pressure sensor that measures a pressure inside the master-cylinder and is electrically connected to the second control apparatus.

A further feature of this invention is that one of a plurality of pressure sensors that detect a brake hydraulic pressure that the master-cylinder generates is supplied with a power supply voltage from a master-cylinder pressure control apparatus that controls the primary piston of the master-cylinder, an analog output from the one pressure sensor is received by the master-cylinder pressure control apparatus and is used for control of the primary piston, another one of the plurality of pressure sensors that detect a brake hydraulic pressure that is generated by the master-cylinder controls operation of a wheel-cylinder pressure control mechanism that supplies a hydraulic pressure for applying a brake to a wheel-cylinder of each wheel that receives the brake hydraulic pressure, and is supplied with a power supply voltage from a wheel-cylinder pressure control apparatus, and an analog output from the other one pressure sensor is supplied to the wheel-cylinder pressure control apparatus and is used for control of the wheel-cylinder pressure control mechanism.

According to this invention, an advantage that measurement accuracy can be improved when measuring a hydraulic pressure that is output from a master-cylinder is achieved.

Figure 1:
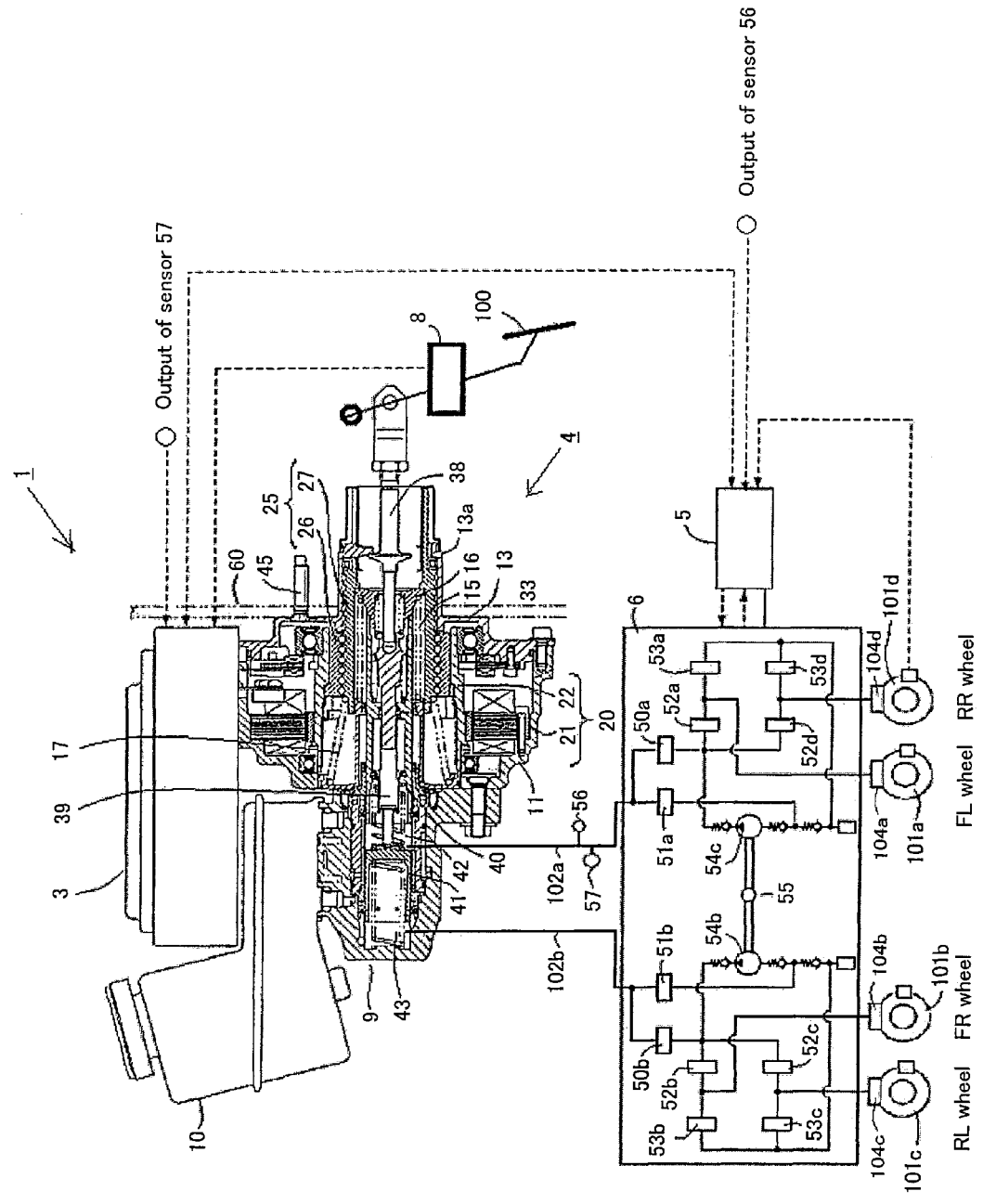
FIG. 1 is a view that illustrates an example of the overall configuration of a brake control system that is an embodiment of the present invention.

DESCRIPTION OF SYMBOLS 1 brake control system
3 master-cylinder pressure control apparatus
4 master-cylinder pressure control mechanism
5 wheel-cylinder pressure control apparatus
6 wheel-cylinder pressure control mechanism
8 brake operation amount detection apparatus
9 master-cylinder
10 reservoir tank
12 casing
15 return spring
16 movable member
17 return spring
20 electric motor
21 stator
22 rotor
25 rotation/linear motion conversion mechanism
26 ball screw nut
27 ball screw shaft
30 transmission member
38 input rod
40 primary piston
41 secondary piston
42 primary fluid chamber
43 secondary fluid chamber
50a to 50b outlet gate valve
51a to 51b inlet gate valve
52a to 52d inlet valve
53a to 53d outlet valve
54a, 54b pump
55 motor
56, 57 master-cylinder pressure sensor
100 brake pedal
101a to 101d disk rotor
102a, 102b master pipe
104a to 104d wheel-cylinder

DETAILED DESCRIPTION OF THE PREFERRED EMBODIMENTS

The embodiments described below solve not only the problem to be solved by the invention as described above, but also solve various problems it is desirable to solve from the viewpoint of a product. Although these are also described in the course of the description of the embodiments, a representative thereof is described next.

Brake-related functions are extremely important for maintaining the safety of a vehicle, and it is desirable to study regarding the maintenance of safety from every angle. According to an example described hereunder, a configuration is adopted such that, even in the event that a failure occurs in control of a primary piston by an electric motor, an input piston is mechanically moved by operation of the brake pedal so that the master-cylinder generates a hydraulic pressure. However, since a hydraulic pressure that the master-cylinder generates as the result of a brake pedal operation is lower by the amount by which the operation is not assisted, it can be considered that the braking force produced by the hydraulic pressure will be insufficient. It is therefore desirable to generate the appropriate hydraulic pressure with a wheel-cylinder pressure control mechanism to control the braking force. To control the wheel-cylinder pressure control mechanism, a wheel-cylinder pressure control apparatus detects the hydraulic pressure of the master-cylinder, and calculates the appropriate braking force based on the detected value and controls the wheel-cylinder pressure control mechanism. The embodiment described below that is according to the above configuration has the advantage of maintaining the safety of brake-related functions in a vehicle.

In the following embodiment, when regenerative braking produced by an electric motor installed in a vehicle, which is a braking force other than a friction braking force, is utilized, it is necessary to generate as a friction braking force a braking force that is reduced by the amount of the braking force generated by regenerative braking. A friction braking force is generated by pressing a disk rotor of a wheel with a wheel-cylinder. Accordingly, a target friction braking force that takes into account the regenerative braking force is calculated with a master-cylinder pressure control apparatus, the actual hydraulic pressure generated by the master-cylinder is detected, and the master-cylinder pressure control mechanism is controlled so that the actual hydraulic pressure is a hydraulic pressure that generates the target friction braking force. If an abnormality occurs in the master-cylinder pressure control mechanism, the wheel-cylinder pressure control mechanism is controlled as described above so that the appropriate braking force is generated by a pressure generation function of the wheel-cylinder pressure control mechanism. By adopting this configuration, in addition to enabling a reduction in the energy consumed by a braking force in a hybrid vehicle, it is also possible to ensure safety. More specifically, according to the embodiment described hereunder it is possible to provide a brake control system that, in comparison to the prior art described above, detects a master-cylinder pressure with a higher accuracy to enable precise brake control, and that is equipped with a backup function for when a failure occurs in a component constituting the master-cylinder pressure control apparatus or the like.

The embodiment described hereunder has a structure in which two master-cylinder pressure sensors are mounted in a master-cylinder. According to this structure, it is possible to reduce the number of components of the brake control system and simplify the assembly work.

FIG. 1 is a view that illustrates the overall configuration of a brake control system according to the present invention. In FIG. 1, the broken lines with attached arrows denote signal wires, and the direction of the arrow represents the flow of the signal.

A brake control system 1 includes a master-cylinder pressure control apparatus 3, a master-cylinder pressure control mechanism 4, a wheel-cylinder pressure control apparatus 5, a wheel-cylinder pressure control mechanism 6, an input rod 38, a brake operation amount detection apparatus 8, a master-cylinder 9, a reservoir tank 10, and wheel-cylinders 104a to 104d. A first pressurizing/depressurizing section includes a brake pedal 100 and the input rod 38. A second pressurizing/depressurizing section includes the master-cylinder pressure control apparatus 3, the master-cylinder pressure control mechanism 4, and a primary piston 40.

The master-cylinder pressure control apparatus 3 and the wheel-cylinder pressure control apparatus 5 execute bidirectional communication to share control commands and the parameters representing the conditions of the vehicle. Here, the term "the parameters representing the conditions of the vehicle" refers to, for example, a yaw rate, a longitudinal acceleration, a lateral acceleration, a handle steering angle, wheel speeds, a vehicle speed, failure information, an operating state and the like.

The master-cylinder pressure control apparatus 3 corresponds to a brake control apparatus. The master-cylinder pressure control apparatus 3 operates by means of electric power supplied from a direct-current power supply mounted in the vehicle. The master-cylinder pressure control apparatus 3 controls an electric motor 20 based on a brake operation amount that is a detection value of the brake operation amount detection apparatus 8 and control commands from the wheel-cylinder pressure control apparatus 5 and the like. In this case, the term "direct-current power supply mounted in the vehicle" refers to a battery mounted in a vehicle and a generator of the vehicle, while for a conventional automobile the term refers to a battery and alternator. In the case of a hybrid automobile or an electric automobile, the direct-current power supply is not limited to the aforementioned battery mounted in the vehicle, and can be realized by a DC/DC convertor that converts a voltage from a high-voltage vehicle power supply into a low voltage power supply such as a 12V or a 24V system, and a low voltage battery.

The master-cylinder pressure control mechanism 4 controls the movement of the primary piston 40 in accordance with a motor drive current output from the master-cylinder pressure control apparatus 3. The master-cylinder pressure control mechanism 4 includes the electric motor 20 that generates a rotational torque and a rotation/linear motion conversion mechanism 25 that converts a rotational motion produced by the rotational torque into a linear motion along a piston shaft.

The wheel-cylinder pressure control apparatus 5 operates by means of electric power supplied from a direct-current power supply mounted in the vehicle. The wheel-cylinder pressure control apparatus 5 has an anti-lock control function that prevents locking of each wheel and a function that controls the wheel-cylinder pressure of each wheel so that the vehicle behavior is not disturbed when the vehicle is driving, and the like. The wheel-cylinder pressure control apparatus 5 calculates a target braking force that should be generated at each wheel based on the parameters representing the conditions of the vehicle, and supplies a hydraulic pressure to the wheel-cylinder pressure control mechanism 6 based on the calculated result to thereby control the wheel-cylinder pressure control mechanism 6. In accordance with the output from the wheel-cylinder pressure control apparatus 5, the wheel-cylinder pressure control mechanism 6 executes control to supply hydraulic fluid that is pressurized by the master-cylinder 9 to each of the wheel-cylinders 104a to 104d, and also controls the hydraulic pressure of the hydraulic fluid that is supplied.

The input rod 38 is coupled with the brake pedal 100, and the other end thereof is mechanically connected to an input piston 39 that is inserted into a primary fluid chamber 42. By adopting this configuration, the hydraulic pressure generated by the master-cylinder by means of the input piston 39 can also be increased by a brake operation of the driver. Thus, even in the event that the electric motor 20 stops due to a fault, a braking force can be produced by operating the brake pedal. Further, a force corresponding to the master-cylinder pressure is applied to the brake pedal 100 through the input rod 38, and is transmitted as a brake pedal reaction force to the driver. This reaction force allows the driver to feel a reaction force that is based on the brake operation amount, and thus the driver can obtain a preferable feeling with respect to the brake operation.

The brake operation amount detection apparatus 8 is a sensor for detecting a required braking force based on a pedal operation amount of the driver. The configuration includes at least one of these sensors. Further, although a displacement sensor that detects a movement angle of the brake pedal 100 or a movement amount of the input rod 38 is used as a sensor in this case, the sensor may also be a pedal force sensor that detects a depression force applied to the brake pedal 100. Further, the sensor configuration of the brake operation amount detection apparatus 8 may include a combination of different kinds of sensors such as a displacement sensor and a pedal force sensor.

The master-cylinder 9 is a tandem type cylinder that has two pressure chambers, namely, a primary fluid chamber 42 that is pressurized by the primary piston 40 and the input piston 39, and a secondary fluid chamber 43 that is pressurized by a secondary piston 41. Hydraulic fluid pressurized in the fluid chambers 42 and 43 by propulsion of the primary piston 40 is supplied to the wheel-cylinder pressure control mechanism 6 through the master pipes 102a and 102b. The reservoir tank 10 has at least two fluid chambers that are partitioned by an unshown partition wall. Each of these fluid chambers is communicably connected to respective fluid chambers 42 and 43 of the master-cylinder 9.

The wheel-cylinders 104a to 104d include a cylinder, a piston, a pad and the like that are not shown in the drawings. In the wheel-cylinders 104a to 104d, the pistons are propelled by the hydraulic fluid supplied from the wheel-cylinder pressure control mechanism 6, and pads coupled to the pistons are pushed against disk rotors 101a to 101d. Since each disk rotor is united with each wheel, the brake torque acting on the disk rotor operates as a braking force that acts between the wheel and the road surface. In the drawings, the terms "FL wheel", "FR wheel", "RL wheel" and "RR wheel" represent "front left wheel", "front right wheel", "rear left wheel", and "rear right wheel", respectively.

Figure 2:
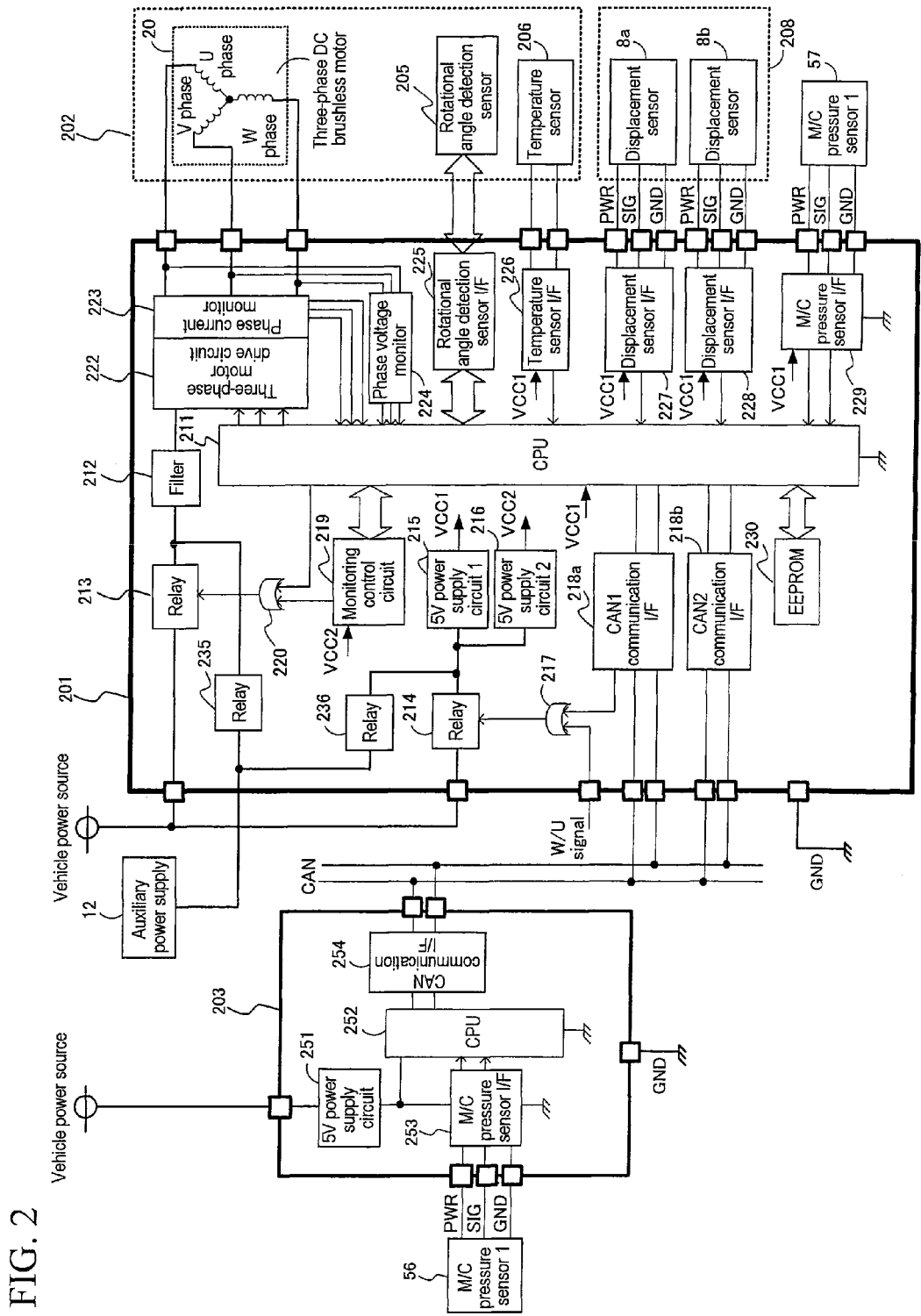
FIG. 2 is a view that illustrates an example of the circuit configuration of a control apparatus according to one embodiment example.

Although not shown in FIG. 1, the brake control system is provided with an auxiliary power supply 12 shown in FIG. 2. The auxiliary power supply 12 is capable of accumulating electric power and also supplying electric power to the master-cylinder pressure control apparatus 3 when the vehicle power source fails, and is suitable as a capacitor from the viewpoint of reliability. A small-sized battery or a vehicle power source of a separate system may be used as the auxiliary power supply 12. In either case, the amount of electric power that can be supplied thereby is small in comparison to the conventional main power supply that supplies electric power to the master-cylinder pressure control apparatus 3.

Next, the configuration and operation of the master-cylinder pressure control mechanism 4 is described. The electric motor 20 is operated by a motor driving current that is controlled with the master-cylinder pressure control apparatus 3, and generates a desired rotational torque. A DC motor, a DC brushless motor, an AC motor or the like are suitable for the electric motor 20, and a DC brushless motor is preferable in terms of controllability, quietness, and durability. A three-phase magnetic motor is used according to this embodiment, in which the rotor has a permanent magnet that operates as a magnetic pole, and a rotational torque is generated in the permanent magnet based on a rotating magnetic field generated at the stator. The electric motor 20 is provided with a position sensor (omitted from the drawings) referred to as a "resolver" that detects a magnetic pole position of the rotor. A signal from the position sensor is input to the master-cylinder pressure control apparatus 3. A rotational amount of the electric motor 20, that is, a movement amount of the primary piston 40, and the current position thereof can be detected based on the signal from the position sensor. Accordingly, the master-cylinder pressure control apparatus 3 calculates a rotational angle of the electric motor 20 based on the signal of the position sensor that detects the magnetic pole position of the rotor. A propulsion amount of the rotation/linear motion conversion mechanism 25, more specifically, a displacement amount of the primary piston 40, can be calculated using the calculated rotational angle.

When the rotational torque of the electric motor 20 is sufficiently large and it is not necessary to amplify the torque, the electric motor 20 and the rotation/linear motion conversion mechanism 25 can be directly coupled without providing the deceleration apparatus. It is thereby possible to avoid various problems relating to reliability, quietness, and mountability and the like that arise due to interposition of the deceleration apparatus.

The rotation/linear motion conversion mechanism 25 converts the rotational torque of the electric motor 20 into a thrust force along the axial direction to push the primary piston 40. It is suitable to use a rack and pinion or ball screw or the like as the conversion mechanism, and in the example shown in FIG. 1 a system using a ball screw is adopted. A rotor 22 of the electric motor 20 is fitted to the outside of a ball screw nut 26. Hence, the ball screw nut 26 is rotated by rotation of the rotor 22. Based on rotation of the ball screw nut 26, a ball screw shaft 27 makes a rectilinear movement along the piston shaft, and the primary piston 40 is moved by the thrust force thereof via a movable member 16. One end of a return spring 15 whose other end is connected to a fixed section is engaged with the opposite side of the movable member 16 that receives the thrust force from the ball screw shaft 27. The return spring 15 is configured so that a force in an opposite direction to the thrust of the ball screw shaft 27 acts on the ball screw shaft 27 via the movable member 16. A return spring 17 is also provided. By means of the return spring 15 and the return spring 17, during a braking operation, more specifically, in a state in which the primary piston 40 is pushed and the master-cylinder pressure is being pressurized, even if the electric motor 20 breaks down and stops and control to return the ball screw shaft is not possible, the ball screw shaft 27 is returned to its initial position by the reaction forces of the return springs 15 and 17 and the master-cylinder pressure drops to around zero. Hence, it is possible to avoid a situation in which the vehicle behavior becomes unstable due to a drag on the braking force.

In the configuration shown in FIG. 1, the master-cylinder pressure control mechanism 4 is retained by being fixed to a partition wall 60 that separates the vehicle cabin and the engine room of the vehicle body. A stator 21 of the electric motor 20 is fixed inside the casing 11, and the rotor 22 is also fixed via a bearing. A fixed cover 13 is provided at an opening on a partition wall 60 side of the casing 11. The casing 11 is fixedly retained on the partition wall 60 by fixing the fixed cover 13 to the partition wall 60 using a fixing screw 45. The rotation/linear motion conversion mechanism 25 that has the ball screw nut 26 and the ball screw shaft 27 is fixed to an inner side of the rotor 22 of the electric motor 20. The primary piston 40 that moves based on the ball screw shaft 27 is also provided on the inner side of the rotor 22. Further, the input piston 39 is provided on the inside of the rotor 22. Since the ball screw nut 26 is disposed so as to be displaced with respect to the stator 21 of the electric motor 20, an advantage is achieved whereby the length in the axial direction is shorter in comparison to the movement amount of the primary piston 40. Further, the axial length of the ball screw nut 26 is shorter than the axial length of the ball screw shaft 27, and this is also a factor in achieving the advantage of a smaller size. Further, since the ball screw shaft 27 which moves has a small radius, a space required for movement thereof is reduced.

The ball screw shaft 27 has a structure that passes over the partition wall 60 and enters the vehicle cabin side, and there is an effect that the length in the axial direction of the master-cylinder pressure control mechanism 4 inside the vehicle cabin can be shortened. The master-cylinder 9 is fixed to the casing 11. The master-cylinder pressure control apparatus 3 is also fixed to the casing 11. Since the structure is one in which the master-cylinder 9 and the master-cylinder pressure control apparatus 3 are retained by the casing 11 in this manner, the overall structure is simple. This has the advantage of leading to a decrease in size and improvement in productivity of the system. The configuration effectively utilizes space by providing one part of the reservoir tank 10 between the master-cylinder 9 and the master-cylinder pressure control apparatus 3. Further, since the movable member 16 is disposed further to the vehicle cabin side than the center of the ball screw shaft 27, and the primary piston 40 is pushed on the opposite side of the master-cylinder 9, it is possible to use a wide space in the axial direction for movably retaining the primary piston 40. Thus, irrespective of whether a thrust force applied to the primary fluid chamber 42 of the master-cylinder 9 is large, there is an advantage whereby the amount of wobbling accompanying movement of the primary piston 40 can be suppressed to a small amount.

Next, amplification of the thrust force of the input rod 38 is described. In Example 1, since the thrust force of the primary piston 40 is added to the thrust force of the input rod 38 when the position of the primary piston 40 is changed in accordance with the displacement amount of the input rod 38 produced by a braking operation of the driver, the primary fluid chamber 42 is pressurized in a manner in which the thrust force of the input rod 38 is amplified. The amplification ratio (hereunder, referred to as "boosting ratio") can be set to an arbitrary value by means of a ratio of a displacement amount of the input piston 39 that is fixed to the input rod 38 to that of the primary piston 40, or a ratio of the cross-sectional area of the input piston 39 to that of the primary piston 40, or the like.

In particular, when displacing the primary piston 40 by the same amount as the displacement amount of the input rod 38, when the cross-sectional area of the input piston 39 is taken as $A_{IR}$ and the cross-sectional area of the primary piston 40 is taken as $A_{PP}$, the boosting ratio is uniquely determined as $(A_{IR}+A_{PP})/A_{IR}$. More specifically, by setting $A_{IR}$ and $A_{PP}$ based on the necessary boosting ratio and controlling the primary piston 40 so that the displacement amount thereof becomes equal to the displacement amount of the input rod 38, i.e. the displacement amount of the input piston 39, a constant boosting ratio can be obtained continuously. The displacement amount of the primary piston 40 is calculated by the master-cylinder pressure control apparatus 3 based on a signal from an unshown position sensor. Although the displacement amounts of the primary piston 40 and the input piston 39 are made equal in the above example, when the displacement amount of the primary piston 40 is made greater than that of the input piston 39 the boosting ratio becomes even larger. In contrast, when control is performed to achieve the opposite state, the boosting ratio becomes smaller. This kind of variable control of the boosting ratio is described next.

Variable boost control process is control processing that allows the primary piston 40 to be displaced by an amount obtained by multiplying the displacement amount of the input rod 38 by a proportional gain (K1). Although it is preferable in terms of controllability that K1 is 1, when a large braking force that exceeds an amount of a braking operation of a driver is required due to emergency braking or the like, the K1 value can be temporarily changed to a value exceeding 1. Consequently, since the master-cylinder pressure can be raised in comparison with a time of ordinary operation (when K1=1) by the same brake operation amount, a greater braking force can be generated. Here, determination of emergency braking can be performed, for example, by determining whether or not a time-change ratio of a signal of the brake operation amount detection apparatus 8 exceeds a predetermined value. As described above, according to the variable boost control process, it is possible to increase or decrease the output hydraulic pressure of the master-cylinder 9 in accordance with the displacement amount of the input rod 38 that accompanies a brake demand from the driver. By supplying the generated hydraulic pressure of the master-cylinder 9 to the wheel-cylinders 104a to 104d of the wheels through the wheel-cylinder pressure control mechanism 6, a friction braking force in accordance with the demand of the driver can be generated.

Further, by changing K1 to a value less than 1, it is also possible to apply regenerative cooperative brake control in a hybrid vehicle. If regenerative braking operates when operating the brake pedal 100, regenerative cooperative brake control is executed that reduces the brake hydraulic pressure by a braking amount obtained by regenerative braking. More specifically, the master-cylinder pressure control apparatus 3 controls the electric motor 20 of the brake control system 1 so as to move back the ball screw shaft 27 by an amount necessary to reduce the pressure based on a signal from the resolver inside the electric motor 20. In response thereto the primary piston 40 of the master-cylinder 9 retreats by a predetermined stroke amount.

Next, processing for automatic brake control is described. The processing relating to automatic brake control is processing that causes the primary piston 40 to advance or retreat so as to adjust the operation pressure of the master-cylinder 9, i.e. the output hydraulic pressure, to the required hydraulic pressure of the automatic brake (hereunder, referred to as "demanded automatic-brake hydraulic pressure"). Any suitable method may be employed as the control method of the primary piston 40 in this case. One such method is a method that, based on a previously acquired relation between the displacement amount of the primary piston and the master-cylinder pressure that is stored in a table, extracts a displacement amount of the primary piston that achieves the demanded automatic-brake hydraulic pressure and sets that displacement amount as a target value. Another available method is a method that feeds back a master-cylinder pressure detected with a master-cylinder pressure sensor 57. In this connection, it is possible to receive the demanded automatic-brake hydraulic pressure from an external unit and the control method can be applied to various brake controls such as, for example, vehicle tracking control, traffic lane deviation avoidance control, obstacle avoidance control and the like.

Next, the configuration and operation of the wheel-cylinder pressure control mechanism 6 is described. The wheel-cylinder pressure control mechanism 6 includes outlet gate valves 50a and 50b that perform control for supplying hydraulic fluid pressurized at the master-cylinder 9 to each wheel-cylinder 104a to 104d, inlet gate valves 51a and 51b that perform control for supplying hydraulic fluid pressurized at the master-cylinder to pumps 54a and 54b, inlet valves 52a to 52d that control the supply of hydraulic fluid to each wheel-cylinder 104a to 104d from the master-cylinder or a pump, outlet valves 53a to 53d that control pressure reduction of the wheel-cylinders 104a to 104d, pumps 54a and 54b that boost the operation pressure generated at the master-cylinder 9, and a motor 55 that drives the pumps. The wheel-cylinder pressure control mechanism 6 is equipped with an anti-lock brake control function and a vehicle behavior stabilization control function.

The wheel-cylinder pressure control mechanism 6 is constituted by two systems, namely, a first brake system that receives a supply of hydraulic fluid from the primary fluid chamber 42 and controls a braking force of the FL wheel and the RR wheel, and a second brake system that receives a supply of hydraulic fluid from the secondary fluid chamber 43 and controls a braking force of the FR wheel and the RL wheel. By adopting this configuration, even if one of the brake systems fails, it is possible to secure the braking force of two wheels at diagonally opposing corners by means of the other brake system that operates normally, and hence the behavior of the vehicle is kept stable.

The outlet gate valves 50a and 50b are provided between the master-cylinder 9 and the inlet valves 52a to 52d. The outlet gate valves 50a and 50b are opened when hydraulic fluid that has been pressurized at the master-cylinder 9 is supplied to the wheel-cylinders 104a to 104d. The inlet gate valves 51a and 51b are provided between the master-cylinder 9 and the pumps 54a and 54b. The inlet gate valves 51a and 51b are opened when the pressure of hydraulic fluid that has been pressurized at the master-cylinder 9 is increased by the pumps and supplied to the wheel-cylinders. The inlet valves 52a to 52d are provided upstream of the wheel-cylinders 104a to 104d, and are opened when supplying hydraulic fluid that has been pressurized at the master-cylinder or the pumps to the wheel-cylinders. The outlet valves 53a to 53d are provided downstream of the wheel-cylinders, and are opened when reducing the pressure of the wheel-cylinders. In this connection, the outlet gate valves, inlet gate valves, inlet valves, and outlet valves are each electromagnetic valves in which valve opening and closing is performed by passing a current to a solenoid (omitted from the drawings), and an opening/closing amount of each valve can be independently adjusted by current control that the wheel-cylinder pressure control apparatus 5 performs.

In the one example of an embodiment shown in FIG. 1, the outlet gate valves 50a and 50b and the inlet valves 52a to 52d are normally open valves, and the inlet gate valves 51a and 51b and the outlet valves 53a to 53d are normally closed valves. By adopting this configuration, even if the power supply to a valve stops due to a failure, since the inlet gate valves 51*a* and 51*b* and the outlet valves 53*a* to 53*d* close and the outlet gate valves 50*a* and 50*b* and the inlet valves 52*a* to 52*d* open such that hydraulic fluid pressurized at the master-cylinder 9 arrives at all the wheel-cylinders 104*a* to 104*d*, a braking force can be generated according to the demand of the driver.

When a pressure exceeding the operation pressure of the master-cylinder 9 is required, for example, to execute vehicle behavior stabilization control, automatic braking or the like, the pumps 54*a* and 54*b* elevate the master-cylinder pressure and supply the elevated pressure to the wheel-cylinders 104*a* to 104*d*. A plunger pump, a trochoid pump, a gear pump or the like may be suitably used for the pumps 54*a* and 54*b*.

The motor 55 operates by means of electric power supplied based on a control command of the wheel-cylinder pressure control apparatus 5, and drives the pumps 54*a* and 54*b* that are coupled to the motor. It is appropriate to use a DC motor, DC brushless motor, AC motor or the like as the motor.

A second master-cylinder pressure sensor 56 is a pressure sensor that detects the hydraulic pressure of the master pipe 102*a*.

Although the configuration and operation of the wheel-cylinder pressure control mechanism 6 has been described above, at the time of a failure of the master-cylinder pressure control apparatus 3, the wheel-cylinder pressure control apparatus 5 detects the amount of a brake operation of the driver by detecting the output hydraulic pressure of the master-cylinder 9 with the master-cylinder pressure sensor 56, and controls the pumps 54*a* and 54*b* and the like so as to generate a wheel-cylinder pressure in accordance with this detection value.

FIG. 2 shows an example of the circuit configuration of a control apparatus in the embodiment example shown in FIG. 1. In FIG. 2, a portion surrounded by a thick-lined frame 201 represents the master-cylinder pressure control apparatus 3, a portion surrounded by a dotted-line frame 202 represents the electrical components and electrical connections of the master-cylinder pressure control mechanism 4, and a portion surrounded by a thick-lined frame 203 represents one part of the circuit configuration of the wheel-cylinder pressure control apparatus 5. Further, a dotted-line frame 208 represents a sensor of the brake operation amount detection apparatus 8. Although the example illustrated in FIG. 2, shows two displacement sensors 8*a* and 8*b*, the number of displacement sensors is not limited to two, and may be one or a number greater than two. Further, the configuration may combine a plurality of pedal force sensors that detect a depression force applied to the brake pedal 100 or one that combines a displacement sensor and a pedal force sensor.

First, in the electrical circuit surrounded by the thick-lined frame 201, a direct-current power is input to a 5V power supply circuit 1 (215) and a 5V power supply circuit 2 (216) from the vehicle power source via a power supply line and a power supply relay 214. A constant voltage power created by the 5V power supply circuits 1 and 2 is supplied to an ECU (Electronic Control Unit). The ECU power supply relay 214 is turned on by either one of a wake-up signal and a wake-up signal generated by CAN (Controller Area Network) reception with a CAN communication OF 218*a*. A door switch signal, a brake switch, an IGN (ignition) switch signal or the like can be used as the wake-up signal. When using a plurality of wake-up signals, a circuit configuration is adopted whereby all the signals are applied to the master-cylinder pressure control apparatus 3, and when any one of the switches of the plurality of signals is turned on, the wake-up signal operates to the side that turns on the ECU power supply relay 214. Further, the configuration is such that if the vehicle power source fails, electric power supplied via an auxiliary power supply relay 236 from the auxiliary power supply 12 is input to the 5V power supply circuit 1 (215) and the 5V power supply circuit 2 (216). As described above, a stable power source VCC1 obtained by the 5V power supply circuit 1 (215) is supplied to a CPU 211 that is a central control circuit. The stable power source VCC2 obtained by the 5V power supply circuit 2 (216) is supplied to a supervisory control circuit 219.

A fail-safe relay circuit 213 can cut-off the power supplied to a three-phase motor drive circuit 222 from a vehicle power source line. The supply and cut-off of power to the three-phase motor drive circuit 222 from the vehicle power source line can be controlled using the CPU 211 and the supervisory control circuit 219. When the vehicle power source fails, power is supplied to the three-phase motor drive circuit 222 from the auxiliary power supply 12 via the auxiliary power supply relay 235. This power supplied from outside is supplied to the three-phase motor drive circuit 222 after passing the power through a filter circuit 212 to remove noise.

Next, a method of switching to the power supply from the auxiliary power supply 12 when the vehicle power source fails is described. Here, the term "vehicle power source fails" refers to a vehicle battery failure or a failure at the vehicle power generator. In the case of a hybrid automobile or an electric automobile, the term "vehicle power source fails" refers to a case in which electric power from the vehicle power source can no longer be supplied to electrical equipment and electronic control apparatuses mounted in the vehicle due to a motor generator failure, a high voltage battery failure, a DC/DC converter failure, a low voltage battery failure or the like.

First, a vehicle power source failure is detected performed by monitoring the voltage of the power supply line from the vehicle power source, and determining that a vehicle power source failure has occurred when the monitored voltage falls below a predetermined value. When a vehicle power source failure is detected, power from the auxiliary power supply is supplied by turning on the auxiliary power supply relay 235 and the auxiliary power supply relay 236 that were in an off state. When a vehicle power source failure is detected and the auxiliary power supply relays 235 and 236 are turned on, it is preferable to turn off the ECU power supply relay 214 and the fail-safe relay circuit 213. The reason is that if the vehicle power source failure is a short circuit fault to the ground of the vehicle power source system, the power of the auxiliary power supply will be consumed until a vehicle fuse upstream of the short circuit location blows. Further, a circuit configuration may be adopted in which an anode is provided on the vehicle power source side to introduce a diode either upstream or downstream of the ECU power supply relay 214 and the fail-safe relay circuit 213.

Vehicle information from outside the master-cylinder pressure control apparatus 3 and control signals such as the demanded automatic-brake hydraulic pressure are input to the CPU 211 via the CAN communication I/F circuits 218*a* and 218*b*. Further, the outputs from a rotational angle detection sensor 205, a motor temperature sensor 206, displacement sensors 8*a* and 8*b*, and the master-cylinder pressure sensor 57 that are disposed on the master-cylinder pressure control mechanism 4 side are input to the CPU 211 via a rotational angle detection sensor I/F circuit 225, a motor temperature sensor I/F circuit 226, displacement sensor I/F circuits 227 and 228, and a master-cylinder pressure sensor I/F circuit 229, respectively.

Control signals from external apparatus and detection values of various sensors at the current time and the like are also input to the CPU 211. Based on these inputs, the CPU 211 outputs an appropriate signal to the three-phase motor drive circuit 222 to control the master-cylinder pressure control mechanism 4. The three-phase motor drive circuit 222 is connected to the electric motor 20 inside the master-cylinder pressure control mechanism 4, and is controlled by the CPU 211 to convert direct-current power into alternating-current power to drive the electric motor 20. A phase-current monitoring circuit 223 and a phase-voltage monitoring circuit 224 are provided for each phase of the three-phase output of the three-phase motor drive circuit 222. The respective phase currents and phase voltages are monitored by the monitor circuits 223 and 224. Based on this information, the CPU 211 controls the three-phase motor drive circuit 222 to appropriately operate the electric motor 20 inside the master-cylinder pressure control mechanism 4. If a value monitored by the phase-voltage monitoring circuit 224 is outside a normal range or control cannot be performed in accordance with a control command, the CPU 211 determines that a fault has occurred.

A storage circuit 230 constituted by, for example, an EEPROM that stores failure information or the like is provided inside the circuit 201 of the master-cylinder pressure control apparatus 3. The storage circuit 230 transmits and receives signals to/from the CPU 211. The CPU 211 stores detected failure information and learned values used for control at the master-cylinder pressure control mechanism 4 such as, for example, the control gain and offset values of various sensors, in the storage circuit 230. The supervisory control circuit 219 is provided inside the circuit 201 of the master-cylinder pressure control apparatus 3, and transmits and receives signals to/from the CPU 211. The supervisory control circuit 219 monitors failures of the CPU 211 and the output voltage VCC1 of the 5V power supply circuit 1 (215) and the like. When the supervisory control circuit 219 detects an abnormality in the CPU 211 or the voltage VCC1 or the like, the supervisory control circuit 219 immediately activates the fail-safe relay circuit 213 to cut off the power supply to the three-phase motor drive circuit 222. The CPU 211 monitors the supervisory control circuit 219 and the output voltage VCC2 of the 5V power supply circuit 1 (216).

According to Example 1, the auxiliary power supply relays 235 and 236 are mounted inside the master-cylinder pressure control apparatus 3, and switching between the power supply from the vehicle power source and the power supply from the auxiliary power supply is performed inside the master-cylinder pressure control apparatus 3. However, a configuration may also be adopted in which the power supply control apparatus on the vehicle side is configured to switch between the power supply from the vehicle power source and the power supply from the auxiliary power supply, and a power supply line to the master-cylinder pressure control apparatus 3 consists of only a line from the vehicle power source.

Example 1

Figure 3A:
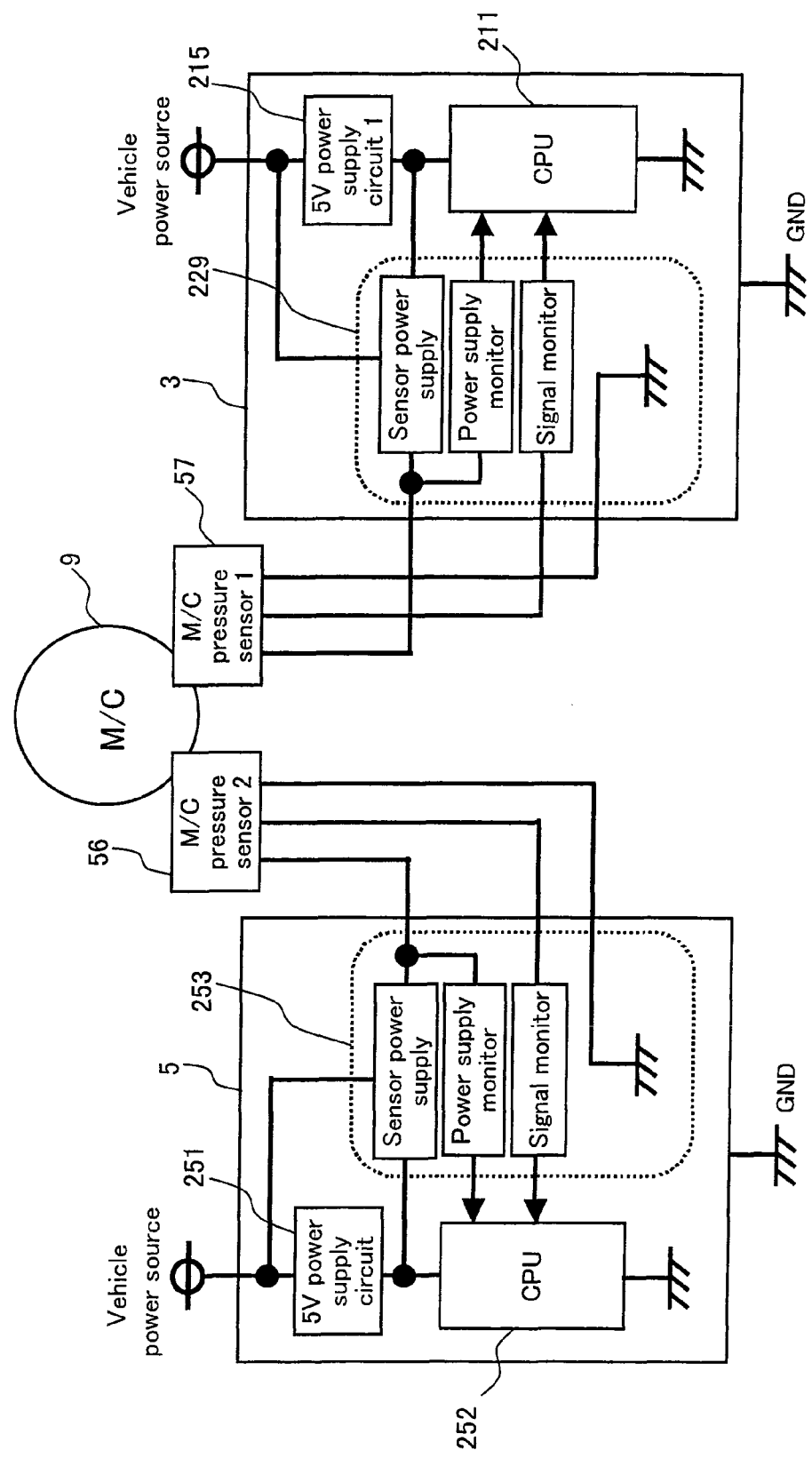
FIG. 3a is a view that illustrates Example 1.

FIG. 3*a* illustrates an apparatus relating to Example 1 of the present invention. Electrical connections between a master-cylinder pressure sensor 1 (57) and a master-cylinder pressure sensor 2 (56) and a method of calculating hydraulic pressure are described below using FIG. 3*a*. In this connection, in the figures referred to below, the master-cylinder is denoted by "M/C" and the master-cylinder pressure sensor is denoted by "M/C sensor".

As shown in FIG. 3*a*, according to Example 1 both the master-cylinder pressure sensor 1 (57) and the master-cylinder pressure sensor 2 (56) are mounted in the master-cylinder 9, and the master-cylinder pressure sensor 1 (57) is electrically connected to the master-cylinder pressure control apparatus 3.

The master-cylinder pressure sensor I/F (interface) circuit 229 includes a circuit for sensor power supply, power supply monitoring, and signal monitoring, respectively.

The sensor power supply circuit applies a reference voltage to a ratiometric sensor. To reduce fluctuations in the output voltage with respect to the output current, a power supply to be supplied to the master-cylinder pressure sensor 1 (57) is generated at a voltage following circuit that takes as a reference voltage a stable power source VCC1 obtained by means of the 5V power supply circuit 1 (215) using an operational amplifier that is driven with the vehicle power source. This also fulfills the role of ground short circuit protection for the sensor power supply line, battery voltage VB short circuit protection, and protection against a static electricity surge in the sensor power supply line.

The power supply monitor circuit executes processing at a stage prior to inputting a power supply voltage generated at the sensor power supply circuit to an A/D converter of the CPU 211 that is the central control circuit. The power supply monitor circuit serves as a noise filter and an overvoltage protection circuit.

The master-cylinder pressure sensor 1 (57) outputs a signal voltage that is in accordance with a hydraulic pressure based on a power supply voltage generated at the sensor power supply circuit.

The signal monitor circuit executes processing at a stage prior to inputting the signal voltage that is output from the master-cylinder pressure sensor 1 (57) to an A/D converter of the CPU 211 of the central control circuit. The signal monitor circuit serves as a noise filter and an overvoltage protection circuit.

The CPU 211 that is the central control circuit calculates a hydraulic pressure based on the power supply voltage input from the A/D converter and the signal voltage. For example, when the output characteristics of the master-cylinder pressure sensor 1 (57) are an output of 10% (0.1 Vpwr) of the power supply voltage at a hydraulic pressure of 0 MPa and an output of 90% (0.9 Vpwr) of the power supply voltage at a hydraulic pressure of 17 MPa, the hydraulic pressure P is calculated with the following formula.

$$P=(V\text{sig}/V\text{pwr}-0.1)\times 17/(0.9-0.1)$$

Where, Vpwr: power supply voltage, and Vsig: signal voltage.

The electrical connections and method of calculating the hydraulic pressure of the master-cylinder pressure control apparatus 3 and the master-cylinder pressure sensor 1 (57) are as described above. The electrical connections and method of calculating the hydraulic pressure of the wheel-cylinder pressure control apparatus 5 and the master-cylinder pressure sensor 2 (56) are the same as for the master-cylinder pressure control apparatus 3 described above.

The above described master-cylinder pressure sensor 1 (57) and master-cylinder pressure sensor 2 (56) respectively include a 5V power supply circuit 1 (215, 251), a 5V CPU (211 and 252), and an I/F circuit (229, 253). Hence, there is little mutual interference between the sensors and it is possible to precisely detect the master-cylinder pressure and detect a failure by comparing the output values thereof.

If a failure occurs at the 5V power supply circuit 1 (215) and the CPU 211, it is not possible to control the master-cylinder pressure control apparatus 3 and the braking force drops to only the amount of the pedal depression force. Furthermore, the master-cylinder pressure sensor 1 (57) can no longer be used. However, according to the present invention, in this case, because the master-cylinder pressure sensor 2 (56) operates normally, the wheel-cylinder pressure control apparatus 5 can detect a brake operation amount of the driver by means of the working hydraulic pressure detected with the master-cylinder pressure sensor 56, and can generate a wheel-cylinder pressure in accordance with this detection value.

Example 2

Figure 3B:
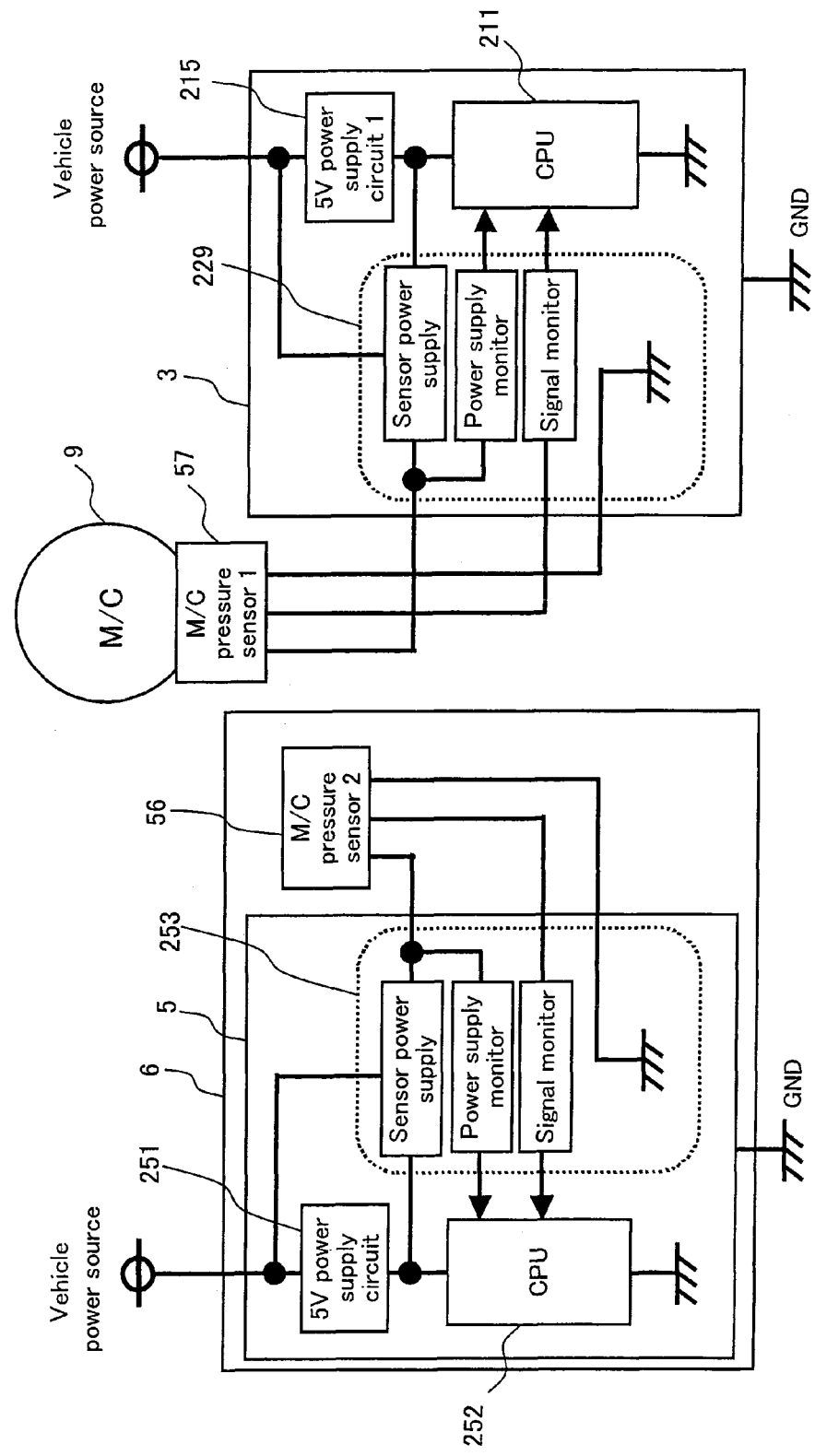
FIG. 3b is a view that illustrates Example 2.

FIG. 3b illustrates an apparatus according to Example 2 of the present invention. Example 2 differs from Example 1 in the respect that the master-cylinder pressure sensor 1 (57) is mounted in the master-cylinder 9, and the master-cylinder pressure sensor 2 (56) is mounted inside the wheel-cylinder pressure control mechanism 6. The electrical connections and method of calculating the hydraulic pressure of the master-cylinder pressure sensor 1 (57) are the same as in Example 1 illustrated in FIG. 3a.

Next, several examples are described regarding the mounting positions of the master-cylinder pressure sensor 1 (57) and the master-cylinder pressure sensor 2 (56).

Example 3

Figure 4A:
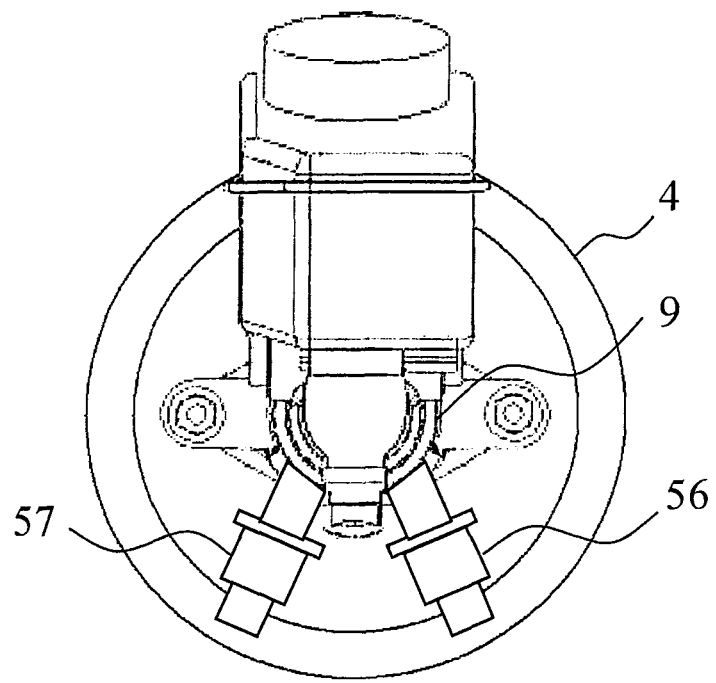
FIG. 4a is a view that illustrates Example 3.

FIG. 4a shows a front view of an apparatus according to Example 3 in which the master-cylinder pressure sensor 1 (57) and the master-cylinder pressure sensor 2 (56) are mounted in the master-cylinder 9 (Example 3 is an example of the outer appearance of the apparatus described in Example 1). According to Example 3, the master-cylinder pressure sensor 1 (57) and the master-cylinder pressure sensor 2 (56) are mounted to the bottom side of the master-cylinder 9 so that a fluid inlet/outlet is positioned as much as possible on the upper side. By mounting the master-cylinder pressure sensor 1 (57) and the master-cylinder pressure sensor 2 (56) in this manner, the bleeding of air from inside the sensors is facilitated when bleeding air.

Further, in the case of installing the master-cylinder pressure sensor 1 (57) and the master-cylinder pressure sensor 2 (56) at the middle of the master pipe 102a that links the fluid chamber 42 of the master-cylinder and the wheel-cylinder pressure control mechanism 6 (refer to FIG. 1 above), it is necessary to divide a piping component into two components and install components for attaching the sensors. However, according to Example 3, by directly installing the master-cylinder pressure sensor 1 (57) and the master-cylinder pressure sensor 2 (56) in the master-cylinder 9, compared to the case of installing the sensors at the middle of the master pipe, there are the advantages that the component costs are reduced, the workability regarding assembly to the vehicle is improved, and the vehicle side layout has a compact arrangement.

Example 4

Figure 4B:
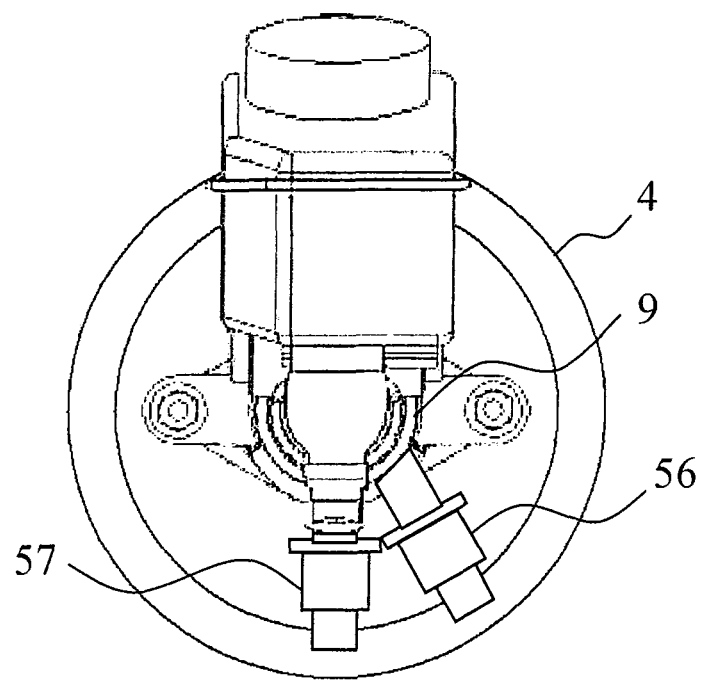
FIG. 4b is a view that illustrates Example 4.

FIG. 4b shows a front view of an apparatus according to Example 4 in which the master-cylinder pressure sensor 1 (57) and the master-cylinder pressure sensor 2 (56) are mounted in the master-cylinder 9 (Example 4 is a different example of the outer appearance of the apparatus described in Example 1). According to Example 4, as shown in FIG. 4b, the positions at which the master-cylinder pressure sensor 1 (57) and the master-cylinder pressure sensor 2 (56) are installed are different to the positions described in Example 3 as illustrated in FIG. 4a. The other details are the same as in Example 3.

Example 5

Figure 5A:
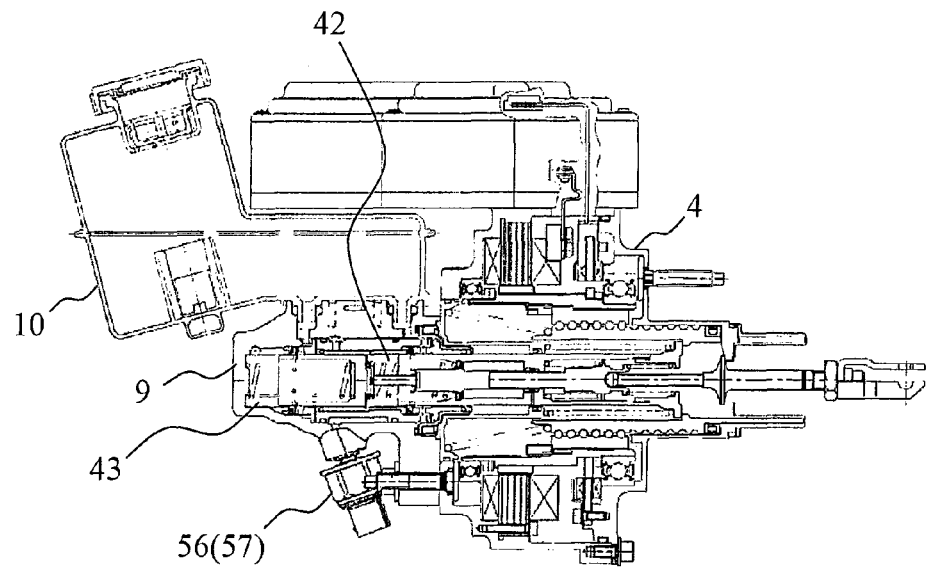
FIG. 5a is a view that illustrates Example 5.

FIG. 5a is a side view of an apparatus according to Example 5 that is an example in which the master-cylinder pressure sensor 1 (57) and the master-cylinder pressure sensor 2 (56) are provided close to the brake operation side that is a lower part of the fluid chamber of the master-cylinder 9. According to Example 5, by installing both the master-cylinder pressure sensor 1 (57) and the master-cylinder pressure sensor 2 (56) downstream of the primary fluid chamber 42 of the master-cylinder 9, these sensors can be provided in a compact arrangement on the underside of the primary fluid chamber 42, and space can be secured on the underside of the secondary fluid chamber 43. Further, since the number of components is reduced and the assembly work is simplified in comparison to the case of providing the master-cylinder pressure sensor 1 (57) and the master-cylinder pressure sensor 2 (56) in a pipeline that links the master-cylinder and the wheel-cylinder pressure control mechanism, this configuration is also advantageous in terms of cost.

Example 6

Figure 5B:
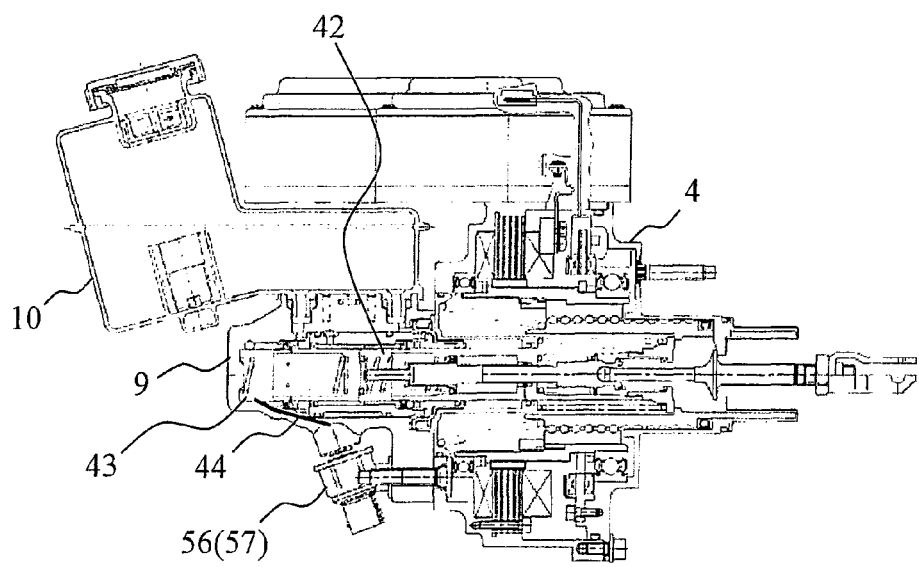
FIG. 5b is a view that illustrates Example 6.

FIG. 5b is a side view of an apparatus according to Example 6. In this apparatus, not only are the master-cylinder pressure sensor 1 (57) and the master-cylinder pressure sensor 2 (56) provided close to the brake operation side that is the lower part of the fluid chamber of the master-cylinder 9, but, furthermore, a flow channel to the master-cylinder pressure sensor 1 (57) is provided downstream of the primary fluid chamber 42 and a flow channel to the master-cylinder pressure sensor 2 (56) is provided downstream of the secondary fluid chamber 43. According to Example 6, as shown in FIG. 5b, since a flow channel 44 from the secondary fluid chamber 43 is provided so as to pass through the inside of a wall on the underside of the cylinder and arrive at the master-cylinder pressure sensor 2 (56), the two master-cylinder pressure sensors that monitor the hydraulic pressures of the primary and secondary systems can be provided in a compact arrangement on the underside of the primary fluid chamber 42.

Figure 6:
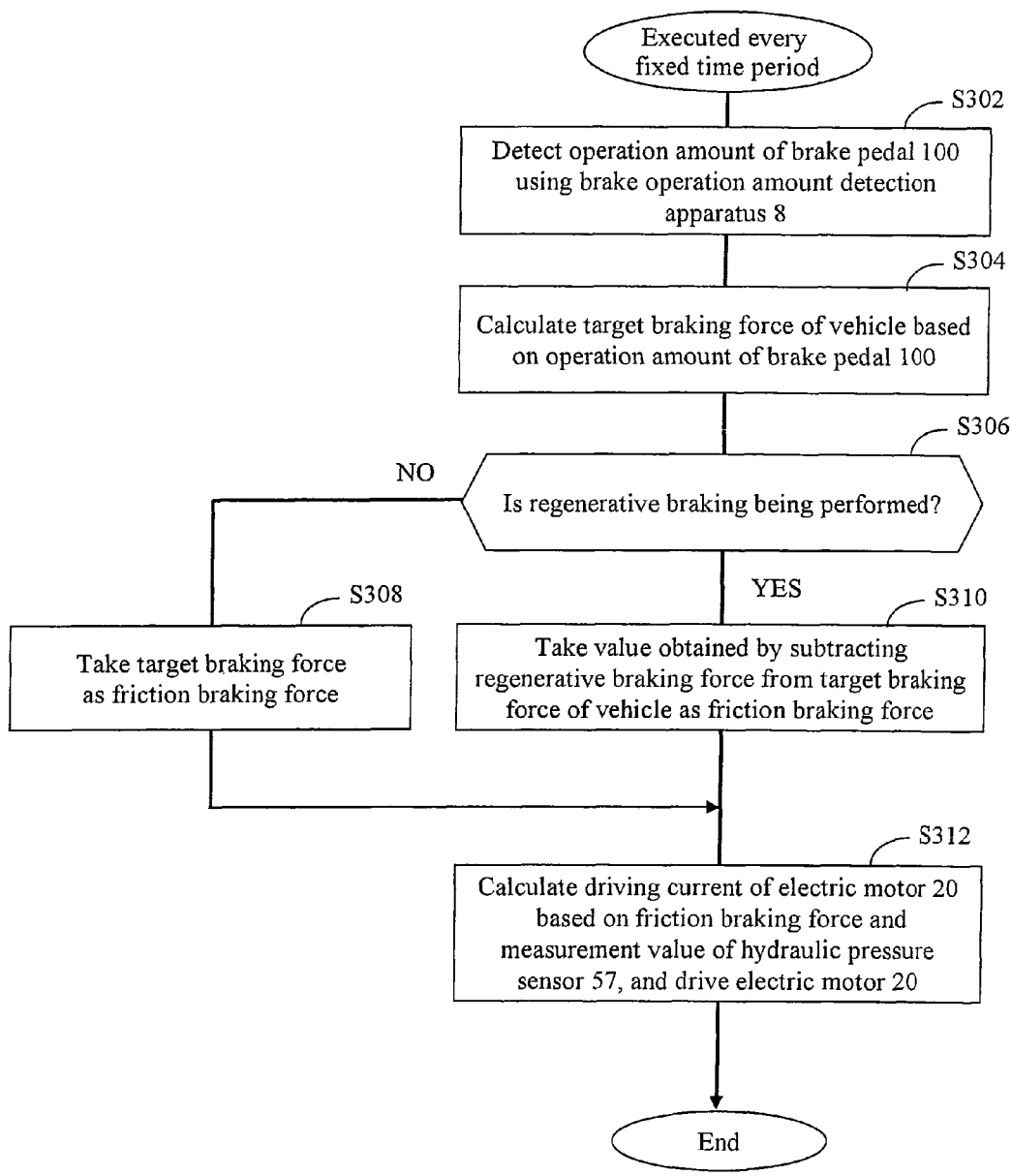
FIG. 6 is a view that shows a flowchart of operations of a master-cylinder pressure control apparatus 3.

FIG. 6 illustrates an example of a flowchart of the operations of the master-cylinder pressure control apparatus 3. In step S302, an operation amount of the brake pedal 100 is measured using the brake operation amount detection apparatus 8. In step S304, the target braking force of the entire vehicle is calculated based on the operation amount of the brake pedal 100. In step S306, the master-cylinder pressure control apparatus 3 confirms whether or not the vehicle is in a regenerative braking state. In a state in which regenerative braking is applied based on a hybrid control apparatus mounted in a hybrid vehicle, an unshown higher order control apparatus determines whether or not the vehicle is in a regenerative braking state and sends a command to the master-cylinder pressure control apparatus 3. When the vehicle is not in a regenerative braking operation mode, in step S308 the entire target braking force is provided by the friction braking force.

When the vehicle is in a regenerative braking operation mode, first, the regenerative braking force is determined. Next, in step S310, a value obtained by subtracting the regenerative braking force from the calculated target braking force is taken as the target friction braking force. The output hydraulic pressure of the master-cylinder 9 is calculated based on the target friction braking force determined in step S308 or step S310. Meanwhile, the actual output hydraulic pressure of the master-cylinder 9 is measured with the master-cylinder pressure sensor 57. The driving current of the electric motor 20 is calculated based on the difference between the target hydraulic pressure and the actual hydraulic pressure that is measured as well as a thrust force that accompanies the target hydraulic pressure, and the calculated driving current is supplied to the electric motor 20 from the master-cylinder pressure control apparatus 3.

Figure 7:
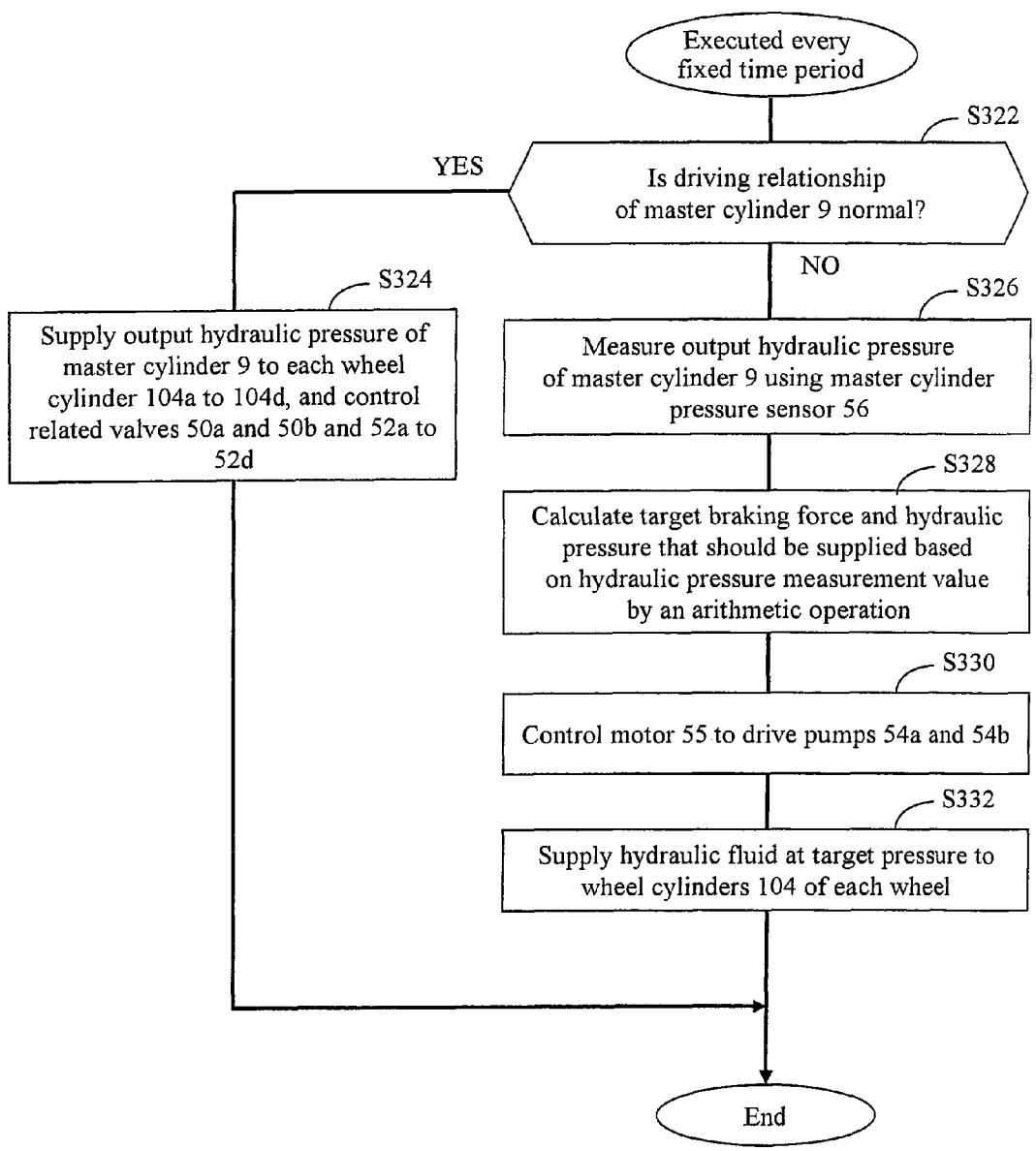
FIG. 7 is a view that illustrates a flowchart of operations of a wheel-cylinder pressure control apparatus 5.

FIG. 7 illustrates a flowchart of the operations of the wheel-cylinder pressure control apparatus 5. When the master-cylinder pressure control apparatus 3 and the master-cylinder pressure control mechanism 4 that actuate the master-cylinder 9 are operating normally in step S322, the operation proceeds to step S324. In step S324, hydraulic fluid that has been sent from the master-cylinder 9 is supplied to the wheel-cylinders 104a to 104d. If it is determined that an abnormality has occurred in step S322, the operation transitions from step S322 to step S326 in which the output hydraulic pressure of the master-cylinder 9 is measured by the master-cylinder pressure sensor 56. The output hydraulic pressure of the master-cylinder pressure sensor 56 represents the operation amount of the brake pedal 100. Therefore, based on the output hydraulic pressure of the master-cylinder 9 that has been measured, in step S328 the target braking force is calculated and, in addition, a hydraulic pressure that should be supplied to the wheel-cylinders 104a to 104d to obtain the target braking force is calculated. In step S330, the motor 55 is controlled to obtain the hydraulic pressure that should be supplied, and the pumps 54a and 54b are driven thereby. In step S332, electromagnetic valves 52a to 52d are actuated to supply the hydraulic pressure generated with the pumps 54a and 54b to the wheel-cylinders 104a to 104d. Thus, the system is made so that the braking force operates normally even in the event that an abnormality occurs.

Further, because the master-cylinder pressure sensor 56 and the master-cylinder pressure sensor 57 are configured to operate by means of a power supply voltage from their respective control apparatuses, measurement can be performed more exactly.

What is claimed is:

1. A brake control system, comprising:
    a master-cylinder including a primary piston that is activated by a brake pedal; a primary fluid chamber that produces hydraulic pressure by a movement of the primary piston; a secondary piston that is moved with the hydraulic pressure in the primary fluid chamber and a secondary fluid chamber that produces hydraulic pressure by a movement of the secondary piston;
    a first mechanism that regulates a pressure inside the master-cylinder according to an amount of operation of the brake pedal;
    a first control apparatus that controls an operation of the first mechanism;
    a second mechanism that regulates communication of the pressure inside the master-cylinder to a wheel-cylinder; and
    a second control apparatus that controls an operation of the second mechanism and an operation of a pump apparatus that increases a pressure that is communicated to the wheel-cylinder;
    wherein:
    the first and second control apparatus each comprises a built-in power supply circuit and a CPU; and
    the master cylinder is provided with
        a first hydraulic pressure sensor that measures a pressure inside the primary fluid chamber in the master-cylinder and is electrically connected to the first control apparatus; and
    a second hydraulic pressure sensor that measures a pressure inside the primary fluid chamber in the master-cylinder and is electrically connected to the second control apparatus; and
    wherein the first hydraulic pressure sensor is supplied with a power supply voltage from the first control apparatus; and
    the second hydraulic pressure sensor is supplied with a power supply voltage from the second control apparatus.

2. The brake control system according to claim 1, wherein the first hydraulic pressure sensor and the second hydraulic pressure sensor are provided close to a brake pedal side on an underside of a hydraulic chamber of the master-cylinder.

3. The brake control system according to claim 2, wherein the first hydraulic pressure sensor is supplied with a power supply voltage from the first control apparatus; and
the second hydraulic pressure sensor is supplied with a power supply voltage from the second control apparatus.

* * * * *